(12) United States Patent
Halliar

(10) Patent No.: US 6,357,959 B1
(45) Date of Patent: Mar. 19, 2002

(54) BOLTLESS CONNECTOR

(75) Inventor: William R. Halliar, Whiting, IN (US)

(73) Assignee: TTX Company, Chicago, IL (US)

( * ) Notice: Subject to any disclaimer, the term of this patent is extended or adjusted under 35 U.S.C. 154(b) by 16 days.

(21) Appl. No.: 09/661,767

(22) Filed: Sep. 14, 2000

(51) Int. Cl.[7] .................................................. F16B 2/14
(52) U.S. Cl. .................. 403/374.1; 403/334; 403/409.1
(58) Field of Search .............................. 403/381, 374.1, 403/373, 380, 335, 336, 338, 331, 333, 334, 409.1, 375, 358

(56) References Cited

U.S. PATENT DOCUMENTS

| | | | |
|---|---|---|---|
| 826,706 A | * | 7/1906 | Brent ...................... 403/381 X |
| 947,349 A | | 1/1910 | Pope |
| 3,329,928 A | * | 7/1967 | Broske ................ 403/374.2 X |
| 3,989,293 A | | 11/1976 | Haberle et al. |
| 4,428,131 A | * | 1/1984 | Hahn ...................... 403/334 X |
| 4,630,803 A | | 12/1986 | Werner et al. |
| 4,768,895 A | | 9/1988 | Ludwig et al. |
| 5,056,764 A | | 10/1991 | Michizuki |
| 5,226,340 A | | 7/1993 | Takeda |
| 5,244,300 A | | 9/1993 | Perreira et al. |
| 5,380,326 A | * | 1/1995 | Lin ...................... 403/409.1 X |
| 5,406,767 A | | 4/1995 | Pech et al. |
| 5,615,965 A | * | 4/1997 | Saurat et al. ........... 403/334 X |
| 5,788,224 A | * | 8/1998 | Platt ....................... 403/331 X |
| 6,076,991 A | * | 6/2000 | Karlsen et al. ............. 403/381 |

* cited by examiner

*Primary Examiner*—Harry C. Kim
(74) *Attorney, Agent, or Firm*—Gardner, Carton & Douglas

(57) ABSTRACT

The present invention relates to the connection of removable and replaceable equipment to a structural member. The invention is particularly advantageous in environments where there is vibration or movement, such as with a tractor-trailers, railroad freight containers, airplane or the like. The present invention provides a triple acting wedge boltless connector system for connecting a mounting member to a structural member. The boltless connector system of the present invention tends to tighten and more securely engage when subject to vibration or movement. Consequently, vibration does not loosen the boltless connection but instead makes the connection more secure. Thus, there is no need for threaded fasteners and washers. The present invention also facilitates easy removal of the equipment from the main structure.

19 Claims, 3 Drawing Sheets

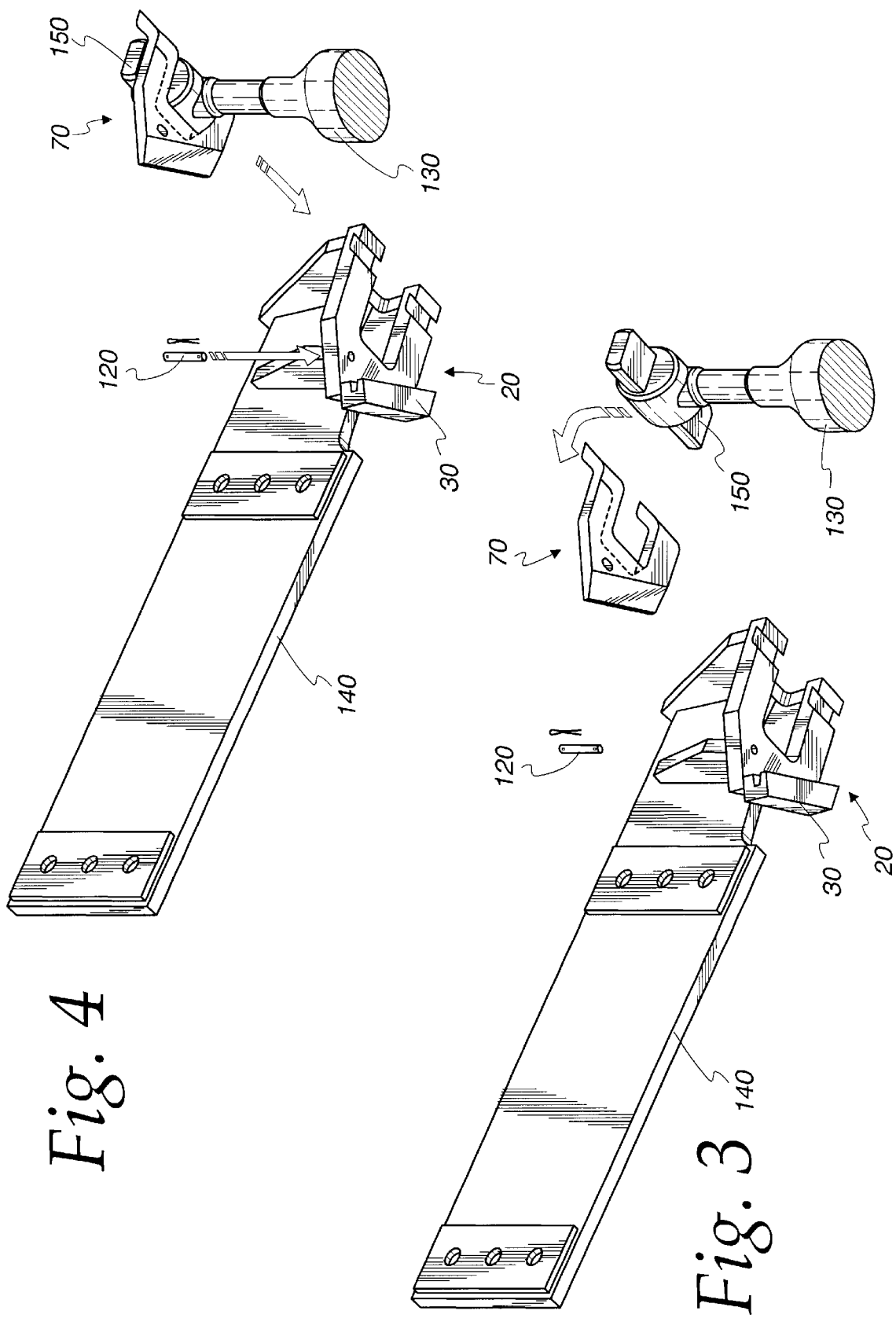

BOLTLESS CONNECTOR

FIELD OF THE INVENTION

The present invention relates in general to a structural connector used to interconnect two structural members. Specifically, this invention relates to the connection of removable and replaceable equipment to a main structure.

BACKGROUND OF THE INVENTION

Several methods and devices are known for connecting removable and replacement equipment. Previously such removable and replaceable equipment has been connected by threaded fasteners, such as bolt connector systems comprising bolts and the like, and spring type lock washers or nuts. Threaded fasteners are vulnerable to vibration and cyclic axial loading. Threaded fasteners tend to loosen, which perpetually reduces the spring pressure from the lock washers. When the spring pressure is lost, the threaded nut can rapidly separate from the threaded bolt. Bolts are difficult to replace in the field because equipment is often located in very close quarters. Therefore, it is difficult to obtain the correct torque for the bolt type fasteners in the field. Additionally, these bolt connector systems tend to loosen when extensive vibration occurs resulting in the bolts coming loose and equipment becoming damaged. Vibration or shock causes the bolt to elongate and loosen the washer. Therefore, there is a need for a boltless connector that overcomes the above-mentioned shortcomings.

SUMMARY OF THE INVENTION

This invention relates to a boltless connector that may be advantageously used in a wide variety of different environments. For example, the connector of the present invention may be used to secure removable and replaceable equipment, such as a storage device, to the main structure of a vehicle used for the transport of materials—vehicles and structures which may be subject to extensive vibration. Typical advantageous applications for the invention may be vehicles such as tractor-trailers, railroad freight containers, and the like. The present invention also relates to the easy and efficient securing and removal of the equipment using the boltless connector of the invention. Accordingly, to overcome the shortcomings of existing connector systems, the boltless connector system of the present invention provides a boltless connector for connecting and securing a member.

According to one embodiment of the invention, the boltless connector system is comprised of two main components which work together to secure a mounting member therebetween. In particular, a generally U-shaped mounting plate and a complimentary wedge are brought into engagement with each other, securely retaining a mounting member therebetween. The mounting plate may be secured to a structure by any conventional method, such as by welding, a bolted connection or other conventional technique. Once the mounting plate and the wedge are brought into engagement, they may be secured together with, for example, a cotter pin that passes through the body of the mounting plate and the wedge.

The mounting plate and the wedge are designed such that during vibration or movement, the mounting plate and the wedge tend to engage even more tightly, due to the relationship of the complimentary engagement surfaces between the two components. In particular, the mounting plate includes an engagement lip, a first leg with a groove and a second leg with a groove that respectively engages in a complimentary manner a wedge having an engagement edge, a first angled extension and a second angled extension. The angled nature of the engagement of the mounting plate with respect to the wedge advantageously tends to more tightly secure the engagement when vibration or other movement is encountered. In this regard, the present invention represents a substantial improvement over conventional and prior art connection techniques which typically tend to loosen when vibration or movement is encountered. Thus, in contrast to prior art designs, vibration and movement tend to enhance the securing effect of the connector of the present invention.

Moreover, the design of the invention is relatively simple, and the connector may clamp a mounting member relatively quickly and easily. Once the mounting member is disposed between the mounting plate and the wedge and the two elements are brought into general alignment, the assembly may be completely secured by tapping into a final position with a hammer and retained with a cotter pin or similar retaining member.

DESCRIPTION OF THE DRAWINGS

The invention may be better understood from the following detailed description when considered in connection with the accompanying drawings, in which:

FIG. 3 is another perspective view illustrating how a mounting member may be retained by the connector assembly of the present invention; and FIG. 4 is another perspective view further illustrating how a mounting member may be retained by the connector assembly of the present invention.

While the invention is described and illustrated herein with respect to certain embodiments, it should be understood that it is not intended to limit the invention to those embodiments. It is intended that the invention covers all alternatives, modifications and equivalents falling within the scope and spirit of the invention defined by the appended claims.

DESCRIPTION OF THE INVENTION

Figure 1:
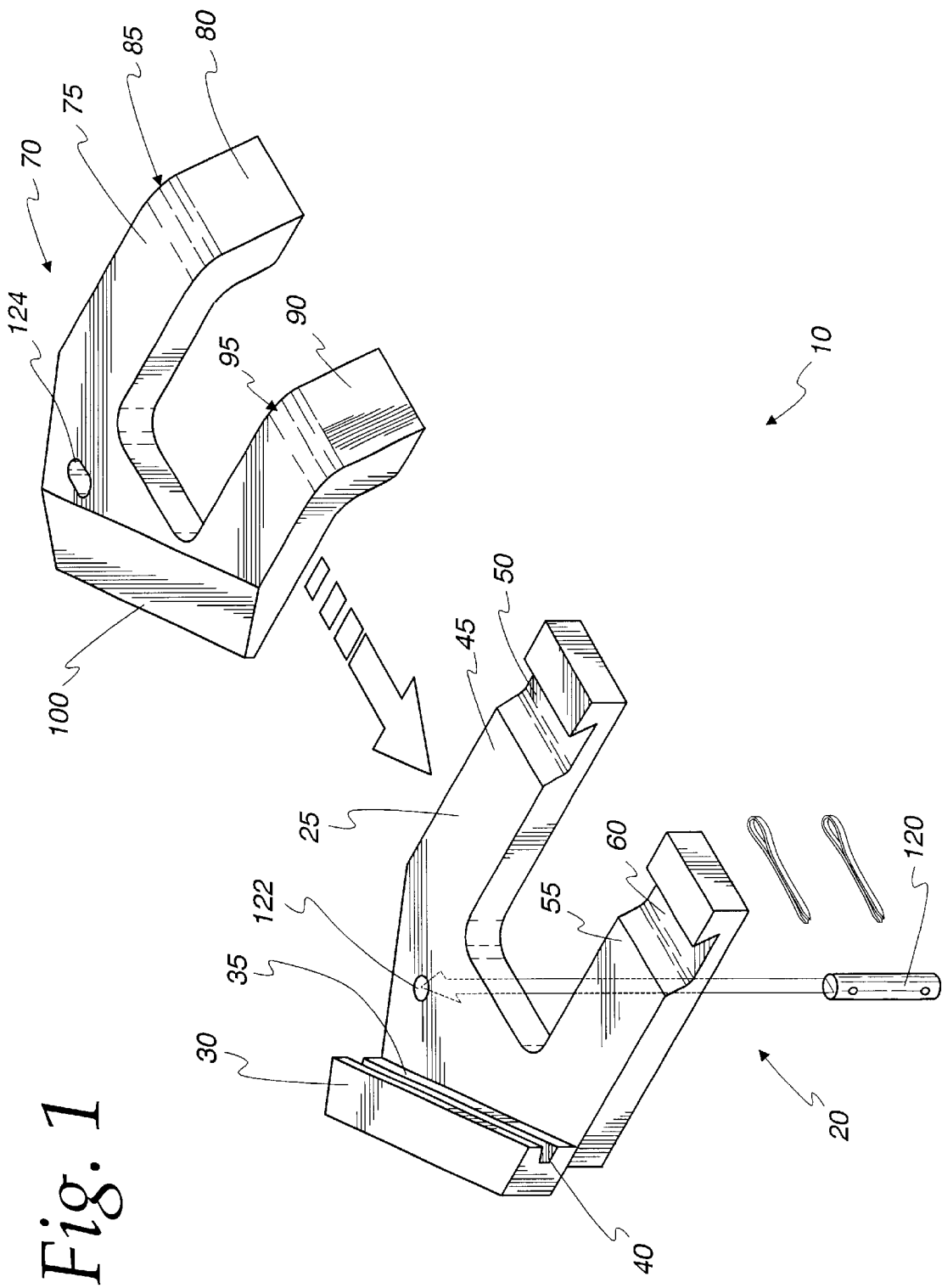
FIG. 1 is a perspective view of the main components according to one embodiment of the connector assembly of the present invention.
Figure 2:
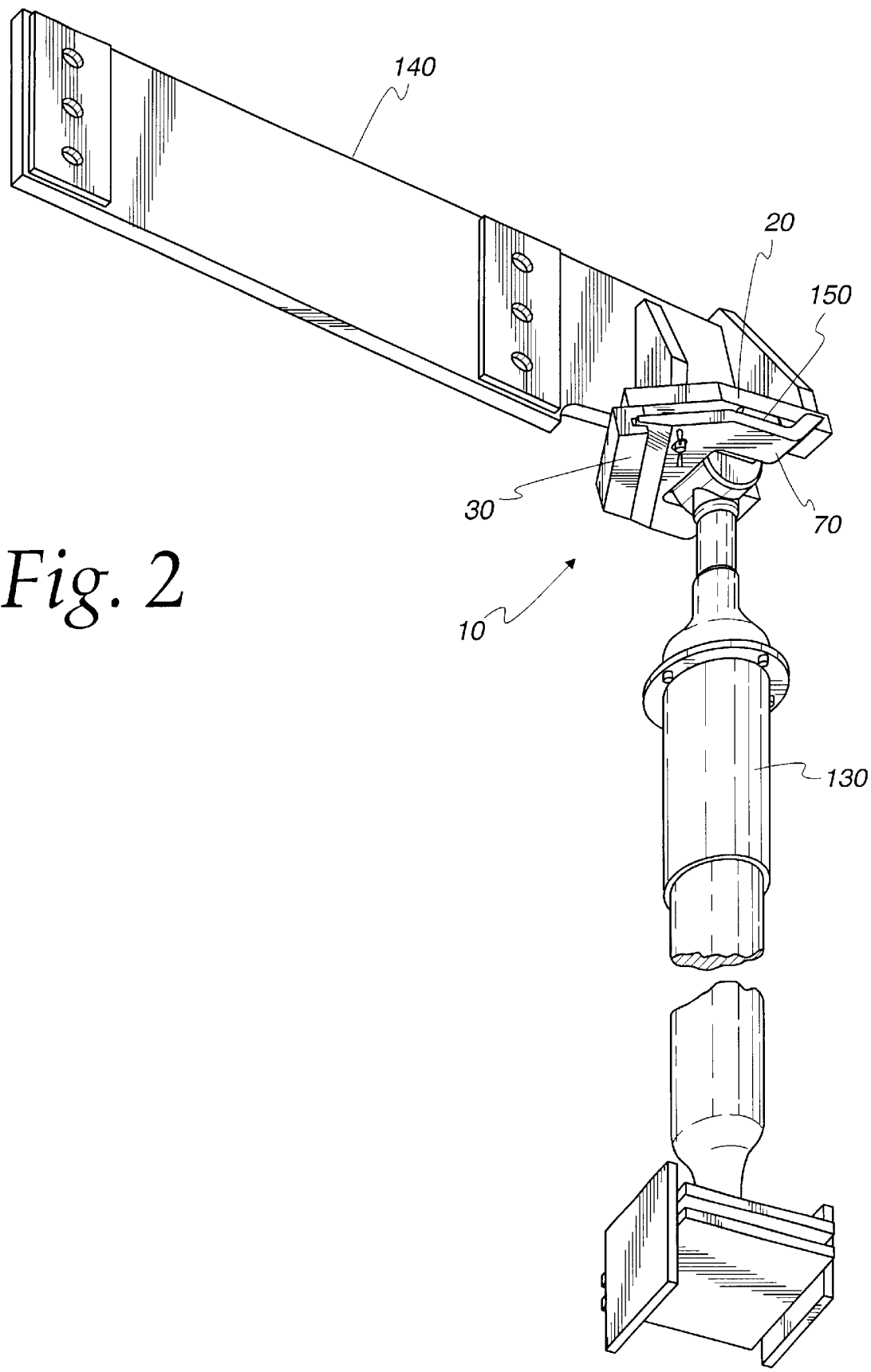
FIG. 2 is a perspective view illustrating the connector assembly of the present invention being used to secure a mounting member.

Referring first to FIG. 1, there is illustrated the boltless connector assembly 10 according to one embodiment of the present invention. As illustrated, the connector assembly 10 includes a generally U-shaped mounting plate 20, having a mounting surface 25. The mounting plate 20 may be secured to a structural member (not shown) through any conventional technique, such as by welding, bolting or otherwise. Such a structural member may be stationary or may be part of a vehicle such as a railroad car, airplane or trailer which may be subject to various vibrations and movement. The mounting plate 20 further includes an engagement lip 30 defining a closed edge of the mounting surface 25. The engagement lip 30 includes an engagement surface 35 planarly displaced from or co-planar with the mounting surface 25. The engagement lip 30 further includes a channel 40 disposed along the length of the engagement lip 30.

The mounting plate 20 further includes a first leg 45 defining a first edge of the mounting surface 25. The first leg 45 is disposed approximately perpendicular to the engagement lip 30. The first leg 45 includes a groove 50 disposed distally to the engagement lip 30 and extending generally transverse to the axis of the first leg 45. The mounting plate 20 further includes a second leg 55 defining a second edge of the mounting surface 25. The second leg 55 is disposed approximately perpendicular to the engagement lip 30 and has a groove 60 disposed distally to the engagement lip 30 and extending generally transverse to the axis of the second leg 55.

The connector assembly 10 further includes a complimentary generally trapezoidal-shaped wedge 70 having a free surface 75 and is adapted to engage the mounting plate 20. The wedge 70 includes a first extension 80 that defines an angle 85 with respect to the free surface 75 at the distal end of the first extension 80. The first extension 80 is complimentary to and is adapted to engage the groove 50 of the first leg 45 of the mounting plate 20. The wedge 70 further includes a second extension 90 that defines an angle 95 with respect to the free surface 75 at the distal end of the second extension 90. The second extension 90 is complimentary to and is adapted to engage the groove 60 of the second leg 55 of the mounting plate 20. The wedge 50 further includes a generally sloped or angled engagement edge 100 disposed distally from the first 80 and second 90 extensions. The engagement edge 100 is adapted to be inserted into and retained within the channel 40 of the engagement lip 30 of the mounting plate 20 in a secure mating relationship in order to join the mounting plate 20 and the wedge 70 together to form a secure connection. The connector assembly 10 of the invention may also include a cotter pin 120 or other retaining mechanism to maintain the relationship between the wedge 70 and the mounting plate 20. As illustrated, a cotter pin 120 may be inserted into a hole 122 of the mounting plate 20 and extend through a complimentary hole 124 of the wedge 70. In some cases, the hole 124 of the wedge 70 may be oblong shaped or slightly larger than the hole 122 of the mounting plate 20 in order to make insertion of the cotter pin 120 easier.

As illustrated in FIG. 1, the mounting plate 20 and the wedge 70 are engaged by moving the wedge 70 toward the mounting plate 20 in the direction of the arrow. The complimentary design of the wedge 70 causes the engagement edge 100, the first extension 80 and the second extension 90 of the wedge 70 to engage, respectively, with the channel 40, the groove 50 of the first leg 45 and the groove 60 of the second leg 55 of the mounting plate 20. In addition, the cotter pin 120 or other retaining mechanism which extends through complimentary holes 122 and 124 of the mounting plate 20 and the wedge 70 will prevent movement of the wedge 70 in a direction opposite the arrow with respect to the mounting plate 20.

As may be appreciated from the illustration, the angled nature of the engagement of the engagement edge 100 of the wedge 70 with the channel 40 of the mounting plate 20 secures the wedge 70 with respect to the mounting plate 20 against movement in a longitudinal direction of the wedge 70 toward the engagement lip 30, as well as against movement in a transverse direction of the wedge 70 with respect to the mounting plate 20 in the direction of the arrow. In addition, the angled nature of the engagement of the first extension 80 of the wedge 70 into the groove 50 of the first leg 45 of the mounting plate 20 as well as the angled nature of the engagement of the second extension 90 of the wedge 70 into the groove 60 of the second leg 55 of the mounting plate 20 secures the wedge 70 with respect to the mounting plate 20 against movement in a longitudinal direction of the wedge 70 away from the engagement lip 30 of the mounting plate 20. Furthermore, in view of the angled nature of the engagement, vibration or movement of the assembly has a tendency to further tighten the engagement of the wedge 70 with respect to the mounting plate 20.

Turning now to FIG. 3, there is illustrated the manner in which the boltless connector assembly 10 of the present invention may be utilized to securely clamp a mounting member 130 within the assembly 10. As illustrated, the mounting plate 20 of the connector assembly 10 is securely attached to a structural member 140, such as a beam. The mounting plate 20 may be attached to the structural member 140 by any conventional technique, such as by welding or bolting the mounting plate 20 to the structural member 140. While the structural member 140 has been illustrated by way of example as a beam, it should be understood that the structural member may be any member to which the mounting plate 20 may be securely attached.

As also illustrated in FIG. 3, the wedge 70 is engaged with the mounting plate 20 and the cotter pin 120 is inserted into the holes 122, 124 of the mounting plate 20 and the wedge 70. Securely clamped between the wedge 70 and the mounting plate 20 is a portion of a mounting member 150. In particular, a mounting member 130, illustrated by way of example in FIG. 3 as a post element, includes at one end a generally flat portion that is adapted to fit between the wedge 70 and the mounting plate 20. In accordance with an important aspect of the present invention, the connector assembly 10 advantageously securely retains the mounting member 130 even in situations where the assembly 10, which is fixed to a structural member 140, may experience significant vibration or movement. The nature of the angled engagement of the wedge 70 with respect to the mounting plate 20 actually operates to tighten the engagement under the effects of vibration or movement.

Turning now to FIGS. 3 and 4, there is illustrated the manner in which the various elements of the connector assembly 10 of the present invention may be assembled together with a mounting member 130 to securely clamp the mounting member 130 between the mounting plate 20 and the wedge 70. In particular, as illustrated in FIG. 3, the mounting member 130 includes at one end a generally flat member 150 that may be disposed between the mounting plate 20 and the wedge 70. To engage the assembly 10 with the mounting member 130, the rectangular member 150 of the mounting member 130 is disposed under the wedge 70. Next, as illustrated in FIG. 4, the wedge 70 and the mounting member 130 are moved together in the direction of the arrow such that the wedge 70 abuts against the stop plate 110 while the first extension 80, the second extension 90 and the engagement edge 100 of the wedge 70 are respectively engaged with the groove 50, and groove 60, and the channel 40 of the mounting plate 20, and the flat member 150 of the mounting member 130 is securely retained between the mounting surface 25 of the mounting plate 20 and the wedge 70. In order to align the wedge 70 and the mounting plate 20 when the rectangular member 150 of the mounting member is retained therebetween, it may be necessary to use a tool, such as a hammer, to tap the wedge 70 into position, so as to align the holes 122, 124 of the mounting plate 20 and the wedge 70 to allow insertion of the cotter pin 120.

As illustrated and described in the foregoing, the engagement lip 30 defines a first acute angle with respect to the first leg 45 and the engagement edge 100 defines a second acute angle with respect to the first extension 80 such that when the wedge 70 is engaged in the mounting plate 20, the first acute angle and the second acute angle are substantially aligned. The first extension 80 and the second extension 90 define an obtuse angle with respect to the free surface 75, and grooves 50, 60 disposed in first and second legs 45, 55 define a third acute angle with respect to the mounting surface 25 such that when the wedge 70 is disposed in the mounting plate 20 the third acute angle and the obtuse angle are substantially aligned. In this regard, the boltless connector assembly 10 of the present invention provides essentially a triple-acting wedge system that advantageously tightens when subjected to vibration or movement.

As should be evident, the boltless connector assembly 10 can be made of any suitable material. Preferably, however, connector assembly 10 will be made from steel, a steel alloy or other rigid material capable of securely maintaining its structural integrity the when subjected to significant forces. The engagement lip 22 can be integrally formed on the mounting plate 20, or may be attached to the mounting plate 20 by any other suitable means such as by welding.

What is claimed is:

1. A boltless connector for retaining a mounting member, the boltless connector comprising:
   (a) a mounting plate defining a mounting surface having a generally U-shape, the mounting plate adapted to receive the mounting member, the mounting plate comprising:
      (1) an engagement lip defining a closed edge of the mounting surface and including an engagement surface planarly displaced from the mounting surface, the engagement lip including a channel, the channel disposed along the length of the engagement lip;
      (2) a first leg defining a first edge of the mounting surface and disposed approximately perpendicular to the engagement lip, the first leg having a groove disposed distally to the engagement lip and generally transverse to a long axis of the first leg;
      (3) a second leg defining a second edge of the mounting surface and disposed approximately perpendicular to the engagement lip, the second leg having a groove disposed distally to the engagement lip and generally transverse to a long axis of the second leg; and
   (b) a wedge having a free surface and an engaging surface adapted to engage the mounting plate and the mounting member, the wedge comprising:
      (1) a first extension, the free end of the first extension defining an angle with respect to the free surface, the first extension adapted to engage the groove of the first leg;
      (2) a second extension, the free end of the second extension defining an angle with respect to the free surface, the second extension adapted to engage the groove on the second leg; and
      (3) an engagement edge disposed distally from the free ends of the first and second extensions, the engagement edge adapted to be inserted into the channel of the engagement lip.

2. The boltless connector of claim 1 further comprising a hole in the mounting plate and a corresponding hole in the wedge such that when the wedge is disposed in the mounting plate, the mounting plate hole and the wedge hole are substantially in alignment.

3. The boltless connector of claim 2 further comprising a pin adapted for insertion through the mounting plate hole and the wedge hole when the wedge is engaged with the mounting plate.

4. The boltless connector of claim 2 wherein the hole in the wedge is larger than the hole in the mounting plate.

5. The boltless connector of claim 1 wherein the engagement lip is disposed angularly on the mounting surface such that the engagement lip defines a first acute angle with respect to the first leg and the engagement edge defines an second acute angle with respect to the first extension, such that when the wedge is disposed in the mounting plate the first acute angle and the second acute angle are aligned.

6. The boltless connector of claim 1 wherein the first and second extensions define an obtuse angle with respect to the free surface, wherein the grooves disposed in each of the first and second legs define an acute angle with respect to the mounting surface such that when the wedge is disposed in the mounting plate the acute angle and the obtuse angle are aligned.

7. The boltless connector of claim 1 wherein the engagement lip is integrally formed on the mounting plate.

8. The boltless connector of claim 1 wherein the engagement lip is attached to the mounting plate.

9. The boltless connector of claim 1 wherein the engagement lip is welded to the mounting plate.

10. A boltless connector for connecting a storage device to a post, the boltless connector comprising:
   (a) a mounting plate defining a mounting surface having a generally U-shape, the mounting plate adapted to connect to the storage device and the mounting plate adapted to receive the post, the mounting plate comprising:
      (1) means for engagement defining a closed edge of the mounting surface and planarly displaced from the mounting surface;
      (2) a first leg defining a first edge of the mounting surface and disposed approximately perpendicularly to the engagement means, the first leg having a groove disposed distally to the engagement means and transverse to a long axis of the first leg;
      (3) a second leg defining a second edge of the mounting surface, and disposed approximately perpendicularly to the engagement means, the second leg having a groove disposed distally to the engagement means and transverse to a long axis of the second leg; and
   (b) a complimentary wedge having a free surface and adapted to engage the mounting plate, the wedge including:
      (1) a first extension, the free end of the first extension defining an arcuate surface, the first extension adapted to engage the groove on the first leg;
      (2) a second extension, the free end of the second extensions defining an arcuate surface, the second extension adapted to engage the groove on the second leg; and
      (3) means for edgewise insertion disposed distally from the free ends of the first and second extensions, the edgewise insertion means adapted to be inserted into the engagement means.

11. The boltless connector of claim 10 wherein the engagement means includes a channel, the channel disposed along the length of the engagement means.

12. The boltless connector of claim 10 further comprising means for retention, the retention means adapted to constrain the wedge to the mounting plate.

13. The boltless connector of claim 12 wherein the retention means further comprises a lower hole through the mounting surface of the mounting plate, an upper hole through the free surface of the wedge, and a pin adapted for insertion through the lower hole and the upper hole, such that when the wedge is disposed in the mounting plate the upper hole and the lower hole are in alignment and the pin is inserted through the lower hole and the upper hole.

14. The boltless connector of claim 13 wherein the upper hole is larger than the lower hole.

15. The boltless connector of claim 10 wherein the engagement means is disposed angularly on the mounting surface such that the engagement means defines a first acute angle with respect to the first leg and the edgewise insertion means defines a second acute angle with respect to the first extension such that when the wedge is disposed in the mounting plate the first acute angle and the second acute angle are aligned.

16. The boltless connector of claim 10 wherein the first and second extensions define an obtuse angle with respect to the free surface, wherein the grooves disposed in each of the first and second legs define an acute angle with respect to the mounting surface such that when the wedge is disposed in the mounting plate the acute angle and the obtuse angle are aligned.

17. The boltless connector of claim 10 wherein the engagement means includes an engagement lip, the engagement lip integrally formed on the mounting plate.

18. The boltless connector of claim 10 wherein the engagement means includes an engagement lip, the engagement lip including means for attaching the engagement lip to the mounting plate.

19. The boltless connector of claim 18 wherein the attaching means comprises a weldment between the engagement lip and the mounting plate.

* * * * *